United States Patent Office 3,328,374
Patented June 27, 1967

3,328,374
PROCESS FOR THE SUSPENSION POLYMERIZATION OF STYRENE
Clifford P. Ronden and John Yu, Edmonton, Alberta, Canada, assignors to The Dow Chemical Company, Midland, Mich., a corporation of Delaware
No Drawing. Filed Mar. 1, 1965, Ser. No. 436,324
6 Claims. (Cl. 260—93.5)

This invention relates to the production of vinyl polymers and more particularly to improved methods for the suspension polymerization of vinyl monomers to obtain superior polymeric products.

Vinyl polymers, and particularly those obtained from vinyl aryl monomers such as styrene, are commonly prepared in bead or "pearl" form by processes in which the monomer is dispersed in a liquid medium, usually water, which is a non-solvent for the monomer, polymerization taking place within the suspended globules or droplets. Referred to as suspension polymerization methods, such procedures have the advantage of offering superior control of temperature, polymerization rate, and molecular weight of the polymer. However, the suspension polymerization methods have one major drawback, arising because the material being polymerized passes through a sticky, viscous phase during which the particles tend to coalesce or cling together, causing formation of aggregates with resultant lack of uniformity as to particle size and molecular weight of the product. Prior-art workers have proposed various ways of combatting this problem, the most practical and economical approach being to add to the initial monomer suspension various types of suspension aids.

The suspension aids most frequently proposed heretofore have been relatively insoluble inorganic suspension stabilizing agents such as tricalcium phosphate, in finely particulate form, such agents providing a physical barrier between the monomeric or partially polymerized droplets and thus tending to prevent agglomeration. Various protective colloids, emulsifiers and surface active agents have also been proposed in the past. In all, however, no way has heretofore been found for so protecting the suspension and controlling the polymerization that polymers of desired high molecular weight and relatively large but controlled particle size can be obtained.

Control of the size of the beads or particles of the polymer product is of particular importance, particularly when, as in the production of certain polystyrenes, the product is made foamable and is to be used for the production of insulating board and the like by continuous extrusion. Thus, it is highly desirable to obtain polystyrene in a bead size range of 590-2000 microns, with a viscosity average molecular weight in excess of 225,000 and a shrinking temperature of at least 110° C. Such a product has not been attainable heretofore by any method capable of practical commercial application.

A general object of this invention is to devise an improved method for polymerizing vinyl monomers in suspension in such fashion as to obtain the polymer in the form of beads in a desired relatively large size range and of a desired relatively high molecular weight.

Another object is to provide such a method characterized by marked reduction in coalescense or agglomeration of the partially polymerized particles.

A further object is to provide a suspension polymerization process capable of producing vinyl polymer beads of greater uniformity as to physical and chemical characteristics, including size, shape, molecular weight, residual free monomer content, and shrinking temperature.

The invention is based on the discovery that, in the suspension polymerization of vinyl monomers, the foregoing objects can be achieved by employing the combination of a particular inorganic suspension stabilizing agent, a surface active agent which is either an anionic agent or an amphoteric agent having both carboxyl and amino functional groups, and a protective colloid, the three suspension aids being incorporated in the initial monomer suspension in particular proportions, and then accomplishing polymerization with agitation and heat under conditions such that the pH of the suspension remains above 5.9.

The inorganic suspension stabilizing agent is employed in the form of a thixotropic paste produced by working the inorganic compound with water in a colloid mill, the inorganic compound initially having an average particle size of 0.5 micron and the operation of the colloid mill being such as to accomplish thorough dispersion of the solid particles without extensive particle size reduction. The thixotropic paste must have a solids-to-water weight ratio of 1:2–2:1, a weight ratio of approximately 1:1 being most advantageous. The inorganic compound employed must be insoluble or, at most, difficultly soluble in the suspension medium. Thus, any difficultly soluble phosphate of calcium, barium, baron, strontium, magnesium, aluminum, zinc or cadmium can be employed. Other typically suitable compounds include the aluminum silicates and fluoro-silicates, magnesium carbonate, magnesium oxide, talc (hydrous magnesium silicate), barium oxalate, barium sulfate, and calcium carbonate. Such agents can be used singly, or the thixotropic paste can employ a combination of different agents such, for example, as tricalcium phosphate with a lesser proportion of calcium carbonate. Compounds of copper or iron are to be avoided.

The thixotropic paste is employed in a proportion providing an amount of suspension stabilizing agent or agents equal to 0.01–2.00% of the total weight of vinyl monomer employed. Advantageously, an amount of suspension stabilizing agent or agents equal to 0.25–0.75% of the monomer weight can be employed.

As surface active agents employed in accordance with the invention, the anionic agents are particularly effective. Typically, we can employ sodium beta naphthalene sulfonate, sodium nonyl naphthalene sulfonate, or sodium butyl naphthalene sulfonate. As amphoteric surface active agents containing both carboxylic and amino functional groups, such compounds as the partial sodium salt of N-lauryl imino dipropionic acid or N-lauryl amino propionic acid are typical.

The surface active agent, or a combination of such agents, is employed in an amount equal to 0.01–2.00% by weight of the total suspension, the narrower range of 0.06–1.20% being most advantageous.

The protective colloid can be a salt of a polyacrylic acid, a gelatin, pectin, any of the suitable starches, the alginates, carboxymethyl cellulose and equivalent cellulose derivatives, polyvinylpyrrolidone, and the like. Particularly good results are achieved with sodium polyacrylate. The protective colloid is employed in an amount equal to 0.001–0.005% of the total suspension weight, the narrower range of 0.00013–0.0017% being superior.

The improvements attained by the invention depend not only upon the use of the three suspension aids discussed above but also on the nature and manner of introduction of the inorganic compound employed as the suspension stabilizing agent. The desired results are virtually impossible to attain under practical operating conditions if the inorganic suspension stabilizing agent is not introduced in the form of a thixotropic paste. In the suspension, the fine particles of the inorganic compound intervene physically between the droplets of monomer and prevent the droplets from directly engaging each other and coalescing. To be capable of acting effectively in this manner, the inorganic compound must have a particle size which is small as compared to the size of the droplets, and the inorganic particles must be uniformly dispersed throughout the suspension. Further, such uniform dispersion must persist throughout at least most of the polymerization procedure.

We have found that, if the inorganic suspension stabilizing agent is added as a dry material to the suspension, successful polymerization to produce a polymer of uniform relatively large bead or particle size cannot be assured even if the amount of suspension stabilizing agent is increased to several times the proportions hereinbefore recited. Further, we have determined that the reason for this difficulty is that, even though the inorganic compound is employed with an average particle size on the order of 0.5 micron, a uniform dispersion in the aqueous medium of the suspension cannot be achieved under practical conditions. This can be demonstrated on a comparative basis by the procedure of the following example:

*Example 1*

A quantity of technical grade tricalcium phosphate is divided into two equal portions, the average particle size in each case being 0.5 micron. One such portion is combined with an equal weight of water and subjected to the action of a colloid mill until a thixotropic paste is employed, the colloid mill being set so as not to accomplish substantial grinding of the particles. The other portion of tricalcium phosphate is employed dry.

Equal quantities of water are introduced into separate glass containers each equipped with a motorized rotary agitator. The thixotropic paste is added to one container and the dry quantity of tricalcium phosphate to the other, the amounts of water employed being such that the weight of tricalcium phosphate is equal to 0.50% of the weight of the water in each container. High speed agitation is carried out for 1 hour and the two containers are then allowed to stand for an additional hour without agitation, the containers then being observed for any tricalcium phosphate which has settled to the bottom. In the container to which the thixotropic paste was added, only a small amount of a very fine sediment will be observed. In the container to which the dry tricalcium phosphate was added, a distinctly larger quantity of settled tricalcium phosphate will be found, this quantity including not just fine particles but relatively large agglomerates of tricalcium phosphate which were not dispersed by the high speed agitation.

In actual polymerization runs under various typical conditions, it has been found that any significant agglomeration of the inorganic suspension stabilizing agent in the suspension before completion of the viscous, sticky intermediate stage of the polymer will lead at least to non-uniformity of bead or particle size in the finished polymer and frequently to total failure of the suspension, with loss of the entire run.

Though achieving of a dependable uniform dispersion of the inorganic stabilizing agent is an essential prerequisite, this factor alone will not provide success in producing polymer beads of the desired uniform relatively large size and high molecular weight. Though both the inorganic compound, such as tricalcium phosphate, and a surface active agent, such as sodium beta naphthalene sulfonate, contribute to establishing a good suspension and preserving the same throughout the critical stages of polymerization, both such agents, when employed in increasing proportions, tend to cause the bead or particle size of the product to decrease, as demonstrated by the following examples:

*Example 2*

A thixotropic paste was produced by combining 8 parts by weight technical grade tricalcium phosphate (average particle size 0.5 micron) and 12 parts by weight demineralized water and passing the mixture twice through a colloid mill. The resulting paste was combined with 1090 parts of demineralized water in a 3 litre glass reactor equipped with a motorized rotary agitator operated at 400 r.p.m. 1100 parts by weight of styrene monomer was then added slowly. The suspension was then heated to 25–30° C., and 1.1 parts by weight of azo bisisobutyronitrile, 0.55 part of benzoyl peroxide and 0.55 part of tertiary butyl peroxide were added. Polymerization was accomplished with the reactor sealed, by heating to 80° C. in 1 hour, holding at 80° C. for 6 hours, heating to 87° C. in 1 hour, holding at that temperature for 6 hours, heating to 95° C. in 1 hour, and holding at 95° C. for 3 hours. The suspension was cooled, acidified to pH 1 with dilute hydrochloric acid, and the beads recovered, washed, and dried at 70° C. for 5 hours. The procedure was repeated 5 times with a different proportion of sodium beta naphthalene sulfonate incorporated at the time of addition of the tricalcium phosphate in each run, the particle size of the product for each run being shown by the following tabulation:

| Run | Sodium beta naphthalene sulfonate (percent by wt.) | Percent of polymer product larger than 590 microns |
|---|---|---|
| 1 | 0.068 | 51.0 |
| 2 | 0.248 | 21.8 |
| 3 | 0.338 | 14.5 |
| 4 | 0.430 | 13.0 |
| 5 | 0.584 | 3.4 |

*Example 3*

The procedure of Example 2 was repeated 5 times, but with the sodium beta naphthalene sulfonate constant at 0.45% by weight and the proportion of tricalcium phosphate varied, the results as to particle size being tabulated as follows:

| Run | Tricalcium phosphate (percent of monomer wt.) | Percent of polymer product larger than 590 microns |
|---|---|---|
| 6 | 0.364 | 77.8 |
| 7 | 0.545 | 67.1 |
| 8 | 0.730 | 13.0 |
| 9 | 0.910 | 26.2 |
| 10 | 1.090 | 7.8 |

On the other hand, we have found that the particle size of the polymer can be increased, while still retaining effective proportions of the inorganic suspending agent and surface active agent, by incorporating a protective colloid as a third suspension aid, as demonstrated by the following example:

*Example 4*

The procedure of Example 2 was repeated 5 times, employing an amount of tricalcium phosphate equal to 0.73% of the weight of styrene monomer, and sodium beta naphthalene sulfonate equal to 0.45% of the total weight of the suspension, but introducing a different amount of sodium polyacrylate into the suspension for each run. In each run, the surface active agent and the protective colloid were added after the catalysts had been introduced and the suspension had been heated to 40° C., the sodium polyacrylate being added as a 15% aqueous solution. The results as to polymer bead size are tabulated below:

| Run | Sodium polyacrylate (percent by wt.) | Percent of polymer product larger than 590 microns |
|---|---|---|
| 11 | 0.000169 | 17.8 |
| 12 | 0.000337 | 10.0 |
| 13 | 0.000673 | 33.8 |
| 14 | 0.001005 | 72.0 |
| 15 | 0.001340 | 85.2 |

The foregoing examples are typical for small scale laboratory runs employed to determine the effect of such variables as relative proportions. The following example is representative for runs carried out under conditions more closely approximating commercial production runs.

*Example 5*

A 10-gallon glass-lined reaction vessel was employed, equipped with a propeller agitator driven at 260 r.p.m. of all runs. All runs were carried out under an inert nitrogen atmosphere, and with the total charge equal to about 80% of reaction capacity. For each run, the following formulation was employed:

Ingredient: Weight in lbs.
- Styrene monomer _____ 33.2.
- Demineralized water _____ 33.2.
- Azobisisobutyronitrile _____ 0.0244.
- Benzoyl peroxide _____ 0.0121.
- Tertiary butyl perbenzoate ____ 0.0298.
- Sodium polyacrylate (1% aqueous solution) _____ 0.77.
- Tricalcium phosphate _____ As tabulated below.
- Sodium beta naphthalene sulfonate _____ As tabulated below.

In each run, the tricalcium phosphate was added in the form of a homogenized thixotropic paste prepared as in Example 2, the paste being added to the water before addition of the styrene monomer. In each run, the sodium polyacrylate and sodium beta naphthalene sulfonate were added after the catalysts had been introduced and the suspension heated to 40° C. Polymerization was accomplished in each run by heating to 85° C. in 45 minutes, holding at 85° C. for 5 hours, heating to 100° C. in 30 minutes, holding at 100° C. for 4.5 hours, heating to 130° C. in 2 hours, and holding at 100° C. for 4.5 hours. The suspension was then acidified to pH 1 by addition of dilute hydrochloric acid, and the beads recovered, washed and dried in air at 70° C. for 5 hours. The results as to bead size for the polymer are tabulated below:

| Run | Tricalcium phosphate (percent of monomer wt.) | Sodium beta naphthalene sulfonate (percent by wt.) | Percent of polymer product larger than 590 microns |
|---|---|---|---|
| 16 | 0.650 | 0.502 | 88.9 |
| 17 | 0.585 | 0.745 | 91.1 |
| 18 | 0.510 | 0.410 | 93.5 |
| 19 | 0.364 | 0.292 | 99.2 |
| 20 | 0.328 | 0.264 | 100.0 |

For each run, the polymer had a viscosity average molecular weight of more than 225,000 and a shrink temperature more than 110° C.

When "shrink temperatures" are mentioned in the foregoing examples, the shrink temperature is obtained by foaming a sample of the beads by heating them in boiling water for 3 minutes, then recovering the foamed beads and determining their bulk density, then dividing the foamed beads into separate samples and heating each such sample at a different selected temperature in the range of 100–130° C. in an air oven for 30 minutes. Thereafter, the beads are cooled in air to room temperature and the bulk density again determined. The shrink temperature is that temperature at which an appreciable change in bulk density of the foamed beads is observed. For example, if the separate samples are heated to 100°, 105°, 110°, 115° C., respectively, and no change in bulk density is observed in the samples heated to 110° C. or less, but a significant change is noted in the sample heated to 115° C., the shrink temperature is taken as 110–115° C.

The embodiments of the invention in which an exclusive property or privilege is claimed are defined as follows:

1. A process for polymerization of styrene monomers to produce polymers in the form of beads predominantly in the size range of 590–2000 microns, comprising preparing an initial aqueous suspension by mixing, at a temperature of at least 40° C., water, the styrene monomer to be polymerized, a thixotropic paste consisting of water and a substantially water-insoluble inorganic finely particulate suspension stabilizing agent, a surface active agent, and a protective colloid; and effecting polymerization of said monomer by combined thermal and catalytic action while maintaining the pH of the suspension above 5.9; said paste having a stabilizing agent-to-water weight ratio of 1:2–2:1 and on initial average particle size of about 0.5 micron, the proportion of said inorganic suspension stabilizing agent employed amounting to 0.10–2.00% of the weight of said monomer; said surface active agent being selected from the group consisting of the sulfonate surface active agents and amphoteric surface active agents containing both carboxyl and amino functional groups, the proportion thereof amounting to 0.01–2.00% of the total weight of the suspension; said protective colloid being employed in an amount equal to 0.0001–0.005% of the total weight of the suspension.

2. A process according to claim 1, wherein said inorganic suspension stabilizing agent is tricalcium phosphate and said paste is prepared by working in a colloid mill water and tricalcium phosphate having an average particle size of 0.5 micron.

3. A process according to claim 1, wherein said surface active agent is an anionic surface active agent and said protective colloid is a salt of a polyacrylic acid.

4. A process according to claim 1, wherein said inorganic suspension stabilizing agent is tricalcium phosphate and said thixotropic paste is employed in a proportion providing an amount of tricalcium phosphate equal to 0.25–0.75% of the weight of the monomer.

5. A process according to claim 1, wherein said surface active agent is employed in an amount equal to 0.06–1.20% of the total weight of the suspension and said protective colloid is employed in an amount equal to 0.00013–0.0017% of the total weight of the suspension.

6. A process according to claim 5, wherein said surface active agent is an anionic surface active agent and said protective colloid is sodium polyacrylate.

References Cited

UNITED STATES PATENTS 2,594,913 4/1952 Grim _____ 260—93.5
3,243,419 3/1966 Ingram _____ 260—93.5

JOSEPH L. SCHOFER, *Primary Examiner.*

J. A. SEIDLECK, *Assistant Examiner.*